Dec. 10, 1968   W. T. CATHEY, JR   3,415,587
LOCAL REFERENCE BEAM GENERATION FOR HOLOGRAPHY
Filed Dec. 8, 1965                         2 Sheets-Sheet 1

INVENTOR.
WADE T. CATHEY JR.

BY *Robert G. Rogers*
ATTORNEY

Dec. 10, 1968  W. T. CATHEY, JR  3,415,587
LOCAL REFERENCE BEAM GENERATION FOR HOLOGRAPHY
Filed Dec. 8, 1965  2 Sheets-Sheet 2

INVENTOR.
WADE L. CATHEY JR.
BY Robert D. Rogers
ATTORNEY

United States Patent Office 3,415,587
Patented Dec. 10, 1968

3,415,587
LOCAL REFERENCE BEAM GENERATION FOR HOLOGRAPHY
Wade T. Cathey, Jr., Placentia, Calif., assignor to North American Rockwell Corporation, a corporation of Delaware
Filed Dec. 8, 1965, Ser. No. 512,388
8 Claims. (Cl. 350—3.5)

ABSTRACT OF THE DISCLOSURE

A system for providing a reference beam for generating a hologram from an electromagnetic wave reflected from an object comprising dividing the reflected wave into a reference portion and an object bearing portion, the object bearing portion being directed onto a photographic plate at a first preselected angle thereto, and focusing the reference portion onto a member having a pinhole aperture therein, the focused reference portion being directed onto the photographic plate at a second preselected angle thereto, the first and second preselected angles being sufficiently different so as to form a hologram on said photographic plate.

---

This invention relates to an improved system for recording a wavefront for producing a hologram and more particularly to an improved system for introducing a reference beam in recording a wavefront to produce a hologram.

In wavefront reconstruction, wavefront correction, or any system requiring recording amplitude and relative phase of an electromagnetic wavefront, a reference beam must be utilized. The reference beam and the sample beam are added and square law detected. The sample beam, which may be described as $A(x,y)e^{i\phi(x,y)}$ is added to the reference beam $A_0 e^{i\alpha x}$ and the sum is squared, giving a wavefront represented by the formula:

$$A_0^2 + A^2(x,y) + 2A_0 A(x,y) \cos[\alpha x - \phi(x,y)]$$

where:

$A(x,y)$ is the amplitude of the sample beam and is an unknown function of spatial coordinates $x$ and $y$;
$\phi(x,y)$ is the phase of the sample beam and is an unknown function of $x$ and $y$;
$A_0$ is the amplitude of the reference beam which may be a function of $x$ and $y$ but which is known; and
$\alpha x$ is the phase of the reference beam which is known and which is a function of $x$ because the reference beam is introduced at an angle to the sample beam.

In certain wavefront reconstruction systems, the reference beam is introduced by placing a mirror near the objects producing the wavefront to be recorded. The mirror must be placed near the object to keep the difference of the path of the reference beam and the path of the object beam less than the coherence length of the source. In many cases, placing of a mirror close to the object is very difficult. Image motion is also a problem because relative motion between the object and the mirror causes a blurring of the hologram. A system is needed which will eliminate the requirement for a mirror and the problem of the coherence length of the source as well as compensating for the relative motion between the objects and the mirror.

The invention described herein provides a means for providing a reference beam in a wavefront reconstruction system which does not depend on mirrors placed near the objects for reflections. As a result, the difficulties introduced because of the difference in path lengths and the relative motion between the object and the mirror are reduced.

Briefly, the invention comprises means for dividing a substantially coherent electromagnetic wavefront reflected from an illuminated object into a reference portion and an object bearing portion. The reference portion is converted into a point source plane wave by pinhole means for use as a reference beam. The invention also comprises means for superimposing the plane wave reference beam onto the object bearing portion of the beam reflected by the illuminated object. The beam portions are superimposed at a predetermined angle with respect to each other. When the object bearing portion, which comprises an irregular wave pattern, is superimposed or made to interfere with the reference portion, which is a plane wave, the resulting interference pattern has an irregularity that is related to the irregularity of the impinging wavefronts. At places where the signal bearing waves have their greatest amplitude, the interference fringes have the greatest contrast. At places of low signal-wave amplitude the fringe contrast is low. These variations in the amplitude of the waves reflected from the object produce corresponding variations in the contrast of the recorded fringe pattern.

The average spacing of the fringes is related to the angle between the signal-bearing waves, object bearing portion, and the reference portion or waves. At places where the signal bearing, object bearing portion makes a large angle with the reference portion, the resulting fringe pattern is comparatively fine. Whereas, where the portions meet at lesser angles the patterns are coarser. Variations in the phase of the signal bearing wave produce variations in the spacing of the fringes on a photographic record about the average value set by the fixed angle between the object and the reference waves. The recorded pattern is often called a hologram. When the pattern is illuminated by a substantially coherent light beam, a three-dimensional view of the illuminated object appears.

Therefore, it is an object of this invention to produce a reference beam from a portion of a wavefront of energy reflected from an illuminated object.

It is another object of this invention to provide a system for producing a hologram which overcomes the problem of coherence length of the energy source.

It is still another object of this invention to eliminate the problem of having a reflecting surface near an illuminated object for producing a reference beam.

It is still another object of this invention to provide a system for eliminating hologram blur due to Doppler shift caused by the movement of an illuminated object.

It is still a further object of this invention to provide an improved system for producing a hologram.

These and other objects of the invention will become apparent from the following detailed description of various embodiments of the present invention taken together with the drawings, which are made a part hereof, in which.

Figure 1:
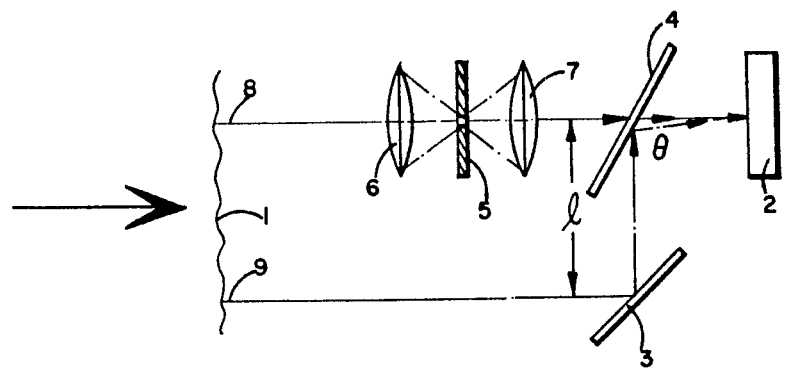
FIG. 1 is one embodiment of the system for superimposing a reference beam on an object bearing beam.

Referring now to FIG. 1, a wavefront 1 is shown impinging upon a first embodiment system for introducing a reference beam in the recording wavefront.

The system comprises recording means 2, on which the hologram is produced, lenses 6 and 7, a pinhole 5, reflecting means 3 and a beam splitter 4. Wavefront 1 is divided into two portions. One portion, called the object-bearing portion 9, impinges upon reflecting means 3, such as a mirror, and is reflected onto beam splitter 4 which reflects that portion to recording means 2 such as a photorecorder. The beams are superimposed at an angle θ to permit interference.

The reference beam is derived from incident beam or wavefront 1. The portion 8 of wavefront 1 used to produce the reference beam is focused onto pinhole 5 by lens 6. The pinhole transforms the incident wavefront energy to a point source so that lens 7 is illuminated by the point source to produce a plane wave. The plane wave passes through beam splitter 4 and is superimposed thereafter with the object bearing portion of the beam on recording means 2 to produce thereon a hologram of the illuminated object (not shown).

Beam splitter 4 and reflecting means 3 have a predetermined spacing between them such that the increased optical length of the reference beam produced by passing through lenses 6 and 7 is compensated for. The optical path length from the object (not shown) to the recording surface of recording means 2 is therefore substantially the same for both wavefront portions.

The operation of lenses 6 and 7 with pinhole 5 can be described in terms of spatial frequency filtering. Lens 6 receives a portion of the wavefront distribution and forms its spatial spectrum in the plane of the pinhole 5. Pinhole 5 passes a low spatial frequency which lens 7 transforms back to the spatial domain. The result is a wavefront which is essentially plane. When the reference beam portion and the object bearing portion are added and squared, the cosine result described hereinbefore results.

Reflecting surface 3 should be of a size comparable to the hologram recording photorecorder 2. Lenses 6 and 7 may be of optical glass and pinhole 5 may be produced by etching a bimetallic plate. The lenses, pinhole, reflecting surface, beam splitter and photorecorder utilized in the above described embodiment of the present invention are standard components well known to those skilled in the art.

Figure 2:
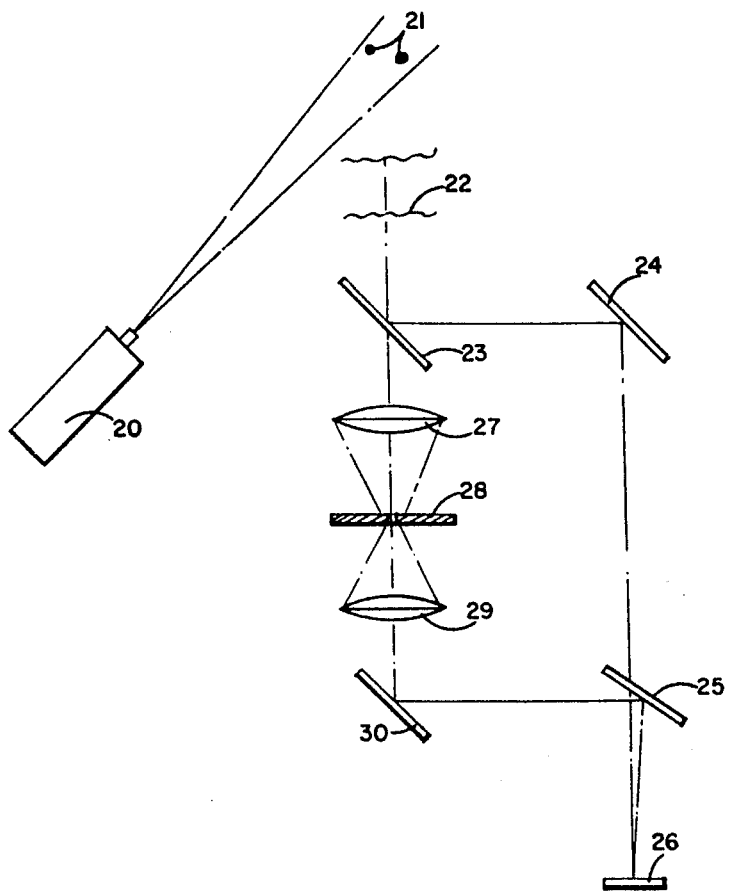
FIG. 2 is a second embodiment of a system producing a reference beam for wavefront reconstruction by spatial filtering.

A second embodiment of the system for obtaining a reference beam for wavefront reconstruction is shown in FIG. 2. A laser 20 is shown illuminating an object 21 which reflects a wavefront 22. A beam splitter 23 divides wavefront 22 into two portions, the first portion being designated the object-bearing portion and the second portion being designated the reference portion. The first portion is reflected onto a mirror 24, through a beam splitter 25 to a recorder 26. The second portion passes through beam splitter 23 and is focused by a lens 27 onto a pinhole 28. This portion of the beam is transformed back to the spatial domain by a lens 29 and is reflected by a mirror 30 and beam splitter 25 onto photorecorder 26. The two beam portions are superimposed or added at an angle θ to produce a hologram from which a view of the illuminated object can be produced.

Figure 3:
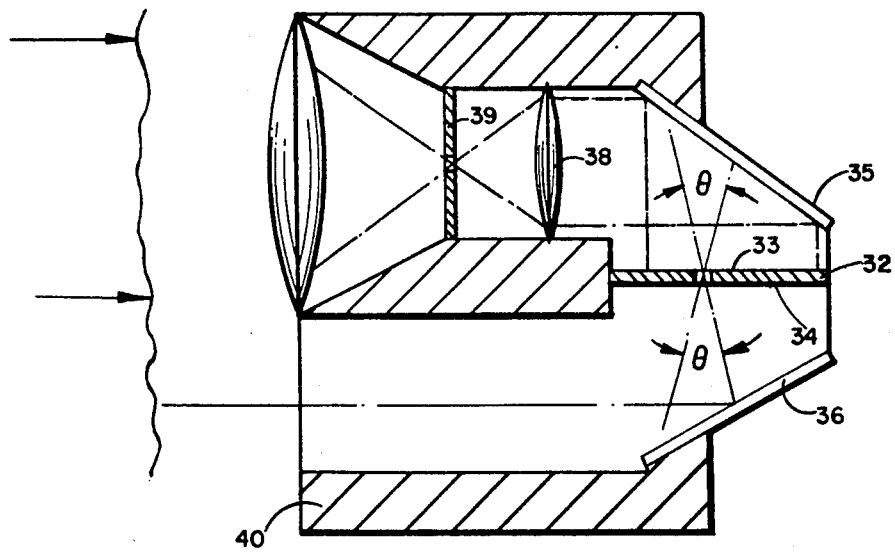
FIG. 3 is a preferred embodiment of a system for producing a hologram.

A preferred embodiment of the system is shown in FIG. 3 and comprises a recording means 32 positioned so that beam interference is produced by having the reference beam impinge on one surface 33 thereof and the object bearing portion impinge on another surface 34 thereof. The two surfaces are on opposite sides of recording means 32 which may be, for example, a photographic plate. The remainder of the embodiment is similar to the above described embodiments. Thus, a pair of reflecting surfaces 35 and 36 are positioned to reflect the reference beam and the object bearing beam, respectively, onto surfaces 33 and 34, respectively, of recording means 32 so that the beams impinge on surfaces 33 and 34 at a relative angle θ. Lenses 37 and 38, with pinhole means 39 for removing aberrations, function as above. The various elements of the embodiment are supported in fixed relationship by a holder 40.

The embodiment of FIG. 3 may be modified by removing lens 38. In such a modified system, even though the reference beam will not be collimated, the system will still produce a hologram.

Although the invention has been described and illustrated in detail, it is to be understood that the same is by way of illustration and example only, and it not to be taken by way of limitation; the spirit and scope of this invention being limited only by the terms of the appended claims.

I claim:
1. A system for generating a hologram from a substantially coherent electromagnetic wave reflected from an object, comprising:
   means for dividing said reflected wave into first and second portions and for directing said first and second portions along first and second paths, respectively, said first portion being directed onto a plane at a first preselected angle thereto;
   means in said second path having an aperture therein; and
   means in said second path for focusing said second portion of said reflected wave onto said aperture means, the wave passed by said aperture means being directed onto said plane at a second preselected angle thereto, said first and second preselected angles being sufficiently different so as to form a hologram on said plane, the difference in the lengths of said first and second paths being less than the coherence length of said electromagnetic wave.
2. The system of claim 1 wherein said electromagnetic wave is a light beam and wherein said means for dividing comprises a beam splitter.
3. The system of claim 2 wherein said means for focusing comprises a lens.
4. The system of claim 1 further comprising:
   means in said second path for converting said focused, second portion into a uniform plane wave, said plane wave being directed onto said plane.
5. The system of claim 4 wherein said electromagnetic wave is a beam of light and wherein said means for focusing and said means for converting comprise a pair of lenses disposed on opposite sides of said aperture means.
6. The system of claim 1 wherein said first and second portions are directed onto the same side of said plane.
7. The system of claim 1 wherein said plane is a recording surface and wherein said first and second portions are directed onto opposite sides of said recording surface.
8. A system for producing a reference beam for forming a hologram comprising:
   means for separating substantially coherent light energy reflected from an object into a reference portion and an object bearing portion; and
   means for converting said reference portion into a plane wave comprising:
      a member having pinhole aperture therein;
      first lens means for focusing said reference portion onto said pinhole aperture; and
      second lens means for producing a plane wave from the light energy emitted from said pinhole aperture.

References Cited

UNITED STATES PATENTS 3,107,170  10/1963  Netke.

OTHER REFERENCES

Leith et al., Jour. of the Optical Society of America, vol. 54, No. 11, pp. 1295–1301, November 1964.

DAVID SCHONBERG, *Primary Examiner.*

RONALD J. STERN, *Assistant Examiner.*

U.S. Cl. X.R.

350—162